(12) United States Patent
Fisher et al.

(10) Patent No.: US 7,277,588 B2
(45) Date of Patent: Oct. 2, 2007

(54) QUANTIZATION AND COMPRESSION OF INFORMATION IN A DIRECT ACYCLIC GRAPH

(75) Inventors: Yuval Fisher, San Marino, CA (US); Julien Signes, San Francisco, CA (US); Eric Deniau, La Baussaine (FR)

(73) Assignee: Envivio, Inc., South San Francisco, CA (US)

( * ) Notice: Subject to any disclaimer, the term of this patent is extended or adjusted under 35 U.S.C. 154(b) by 0 days.

(21) Appl. No.: 11/406,061

(22) Filed: Apr. 18, 2006

(65) Prior Publication Data

US 2006/0245659 A1 Nov. 2, 2006

Related U.S. Application Data

(63) Continuation of application No. 10/806,055, filed on Mar. 22, 2004, now Pat. No. 7,039,251, which is a continuation of application No. 10/222,954, filed on Aug. 15, 2002, now Pat. No. 6,711,300.

(51) Int. Cl.
*G06K 9/36* (2006.01)
*G06K 9/38* (2006.01)
*G06K 9/46* (2006.01)

(52) U.S. Cl. .................................. 382/253; 382/240

(58) Field of Classification Search ................ 382/239, 382/240, 251, 252, 253; 375/240.03, 240.05; 707/3, 4, 5, 7; 709/223, 239, 240
See application file for complete search history.

(56) References Cited

U.S. PATENT DOCUMENTS 6,023,296 A 2/2000 Lee et al.
6,069,977 A 5/2000 Kim et al.
6,084,908 A 7/2000 Chiang et al.
6,351,491 B1 2/2002 Lee et al.
6,356,902 B1 3/2002 Tan et al.
6,490,627 B1 12/2002 Kalra et al.
6,711,300 B2 3/2004 Fisher et al.
7,039,251 B2 5/2006 Fisher et al.
2003/0222883 A1 12/2003 Deniau
2004/0032422 A1 2/2004 Fisher et al.
2004/0252904 A1 12/2004 Fisher et al.
2005/0038533 A1 2/2005 Farrell et al.
2006/0245659 A1 11/2006 Fisher et al.

FOREIGN PATENT DOCUMENTS

WO WO 03/102874 A1 12/2003
WO WO 2004/017623 A2 2/2004

*Primary Examiner*—Yon J. Couso
(74) *Attorney, Agent, or Firm*—Swernofsky Law Group PC

(57) ABSTRACT

A technique wherein the number and position of a quantization parameter node is determined in response to the quantization parameters and a preselected error. The size of scene graph and the corresponding amount of memory required to store the scene graph can be reduced by selective placement of quantization parameter nodes in a scene graph. The scene graph is traversed depth first to establish an order and then traversed in reverse. At each node, a calculation relating to (1) the relative cost of inserting a quantization parameter node and (2) the relative savings that result from insertion of a quantization node is performed. Quantization parameter nodes are selectively placed in response to a result of these calculations. The maximum degree of acceptable error value is chosen for each quantization type. This error value limits the number of quantization parameter nodes that can be placed in a scene graph.

14 Claims, 5 Drawing Sheets

QUANTIZATION AND COMPRESSION OF INFORMATION IN A DIRECT ACYCLIC GRAPH

CROSS REFERENCE TO RELATED APPLICATIONS

This application is a continuation of U.S. application Ser. No. 10/806,055, now allowed, filed Mar. 22, 2004 now U.S. Pat. No. 7,039,251, which is a continuation of U.S. application Ser. No. 10/222,954, U.S. Pat. No. 6,711,300, filed Aug. 15, 2002.

BACKGROUND OF THE INVENTION

1. Field of the Invention

The invention relates to compressing information stored in a scene graph used in a multi-media presentation.

2. Related Art

MPEG-4 (Moving Pictures Expert Group) is a digital bit stream format used to broadcast or multicast ("netcast") multimedia presentations. Elements such as HTML objects, Flash animations, audio/visual streams, Java scripts and similar objects can be included in an MPEG-4 scene. The MPEG-4 scene is constructed as a direct acyclic graph of nodes (also referred to as a scene graph) arranged in a hierarchical tree. Grouping nodes are used to construct the scene structure. Children of grouping nodes are used to represent the various multimedia objects in the scene. These children may also have siblings that such that each sibling is associated with a multimedia object. Each node includes a list of fields that define the particular behavior of the node. Taken together, the nodes in a scene graph represent the layout, presentation, interactions and animation of a multimedia scene.

One problem associated with using scene graphs to store information is that a scene graph for a relatively complex scene is very large. A correspondingly large memory is required to store all the scene graphs in a given presentation. The available bandwidth may not be sufficiently large, thus necessitating uncomfortably long download times.

One approach to solving this problem involves inserting a quantization parameter node at the top of the scene graph (that is, in a position that is relatively proximate to the root node) or at one or more other locations in the graph. A quantization parameter node is a specialized node that shows how scene parameters (such as color, angle, scale, rotation and others) are used to specify an aspect of the scene graph or a portion of the scene graph are to be quantized. However, the degree of compression that results from this approach in not optimal because the locations where the quantization parameter nodes are placed are not responsive to the values being quantized. For example, in very small scenes, the cost (as measured by the number of bits) of specifying the quantization parameter may exceed the number of bits saved in the scene by including the quantization parameter node. In very large scenes, the degree of compression may be less than optimal because an insufficient number of quantization parameter nodes have been inserted, such that the quantization parameters include a maximum and minimum quantization range for extremely disparate values. In short, the problem of determining an efficient placement of quantization nodes, particularly with respect to an acceptable error range, remains unsolved.

SUMMARY OF THE INVENTION

In a first aspect of the invention, the size of a scene graph and the corresponding amount of memory required to store the scene graph can be reduced by selective placement of quantization parameter nodes in a scene graph. Unlike the prior art of placing the quantization parameter node at the top of the scene graph or at the top of each subtree, a technique is presented for traversing a scene graph so as to determine the most efficient placement of quantization parameter nodes.

The scene graph is traversed depth first to establish an order and then traversed in reverse order. At each node, a calculation relating to (1) the relative cost of inserting a quantization parameter node, and (2) the relative savings that result from insertion of a quantization node is performed. Quantization parameter nodes are selectively placed in response to a result of these calculations. Locations in the scene graph where subtrees of the graph include clustered values (that is, values that fall within a particular range) are identified and quantization parameters that are responsive to these clustered values are inserted. This selective placement of quantization parameters reduces the size of a scene graph substantially. The scene and all of it's various audio-visual components can be transmitted and presented using less memory because a small range of values is used for each portion of the graph controlled by a particular quantization parameter node.

In a second aspect of the invention, the maximum degree of acceptable error value (designated herein as $\epsilon_{max}$) is chosen for each quantization type. This error value limits the number of quantization parameter nodes that can be placed in a scene graph. While the insertion of quantization parameter nodes increases the error, this increase remains less than a preselected maximum acceptable value.

DETAILED DESCRIPTION OF THE PREFERRED EMBODIMENT

In the description herein, a preferred embodiment of the invention is described, including preferred process steps, materials and structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspect of the invention or it's embodiments. The general meaning of each of these terms is intended to be illustrative and in no way limiting.

Quantization—as used herein, the term "quantization" describes a process in which a range of values in a scene graph is represented using a fixed number of bits. The quantization process takes place prior to representing the scene graph in a compressed format. When the compressed scene graph is to be uncompressed, a reverse quantization process is used to return the parameter values to an approximation of their original values.

Quantization parameter node—as used herein, the phrase "quantization parameter node" refers to a special node in a scene graph that specifies how sections of the scene graph or subtrees in the scene graph are quantized.

Scene graph—as used herein, the term "scene graph" is a tree structure that includes a set of nodes that are placeholders for information regarding the display of an object in an MPEG-4 scene or other mixed media presentation. An exemplary scene graph may include a root node associated with an object and a set of dependent nodes associated with various properties of that object such as color, transparency and texture. Additional nodes and subtrees can also be included. Taken by itself, the scene graph is static and acts as a container for information.

Scene—as used herein, the term "scene" refers to a set of objects and other elements (for example, sprites) that are present at any one point in time during a multimedia display.

System Elements

Figure 1:
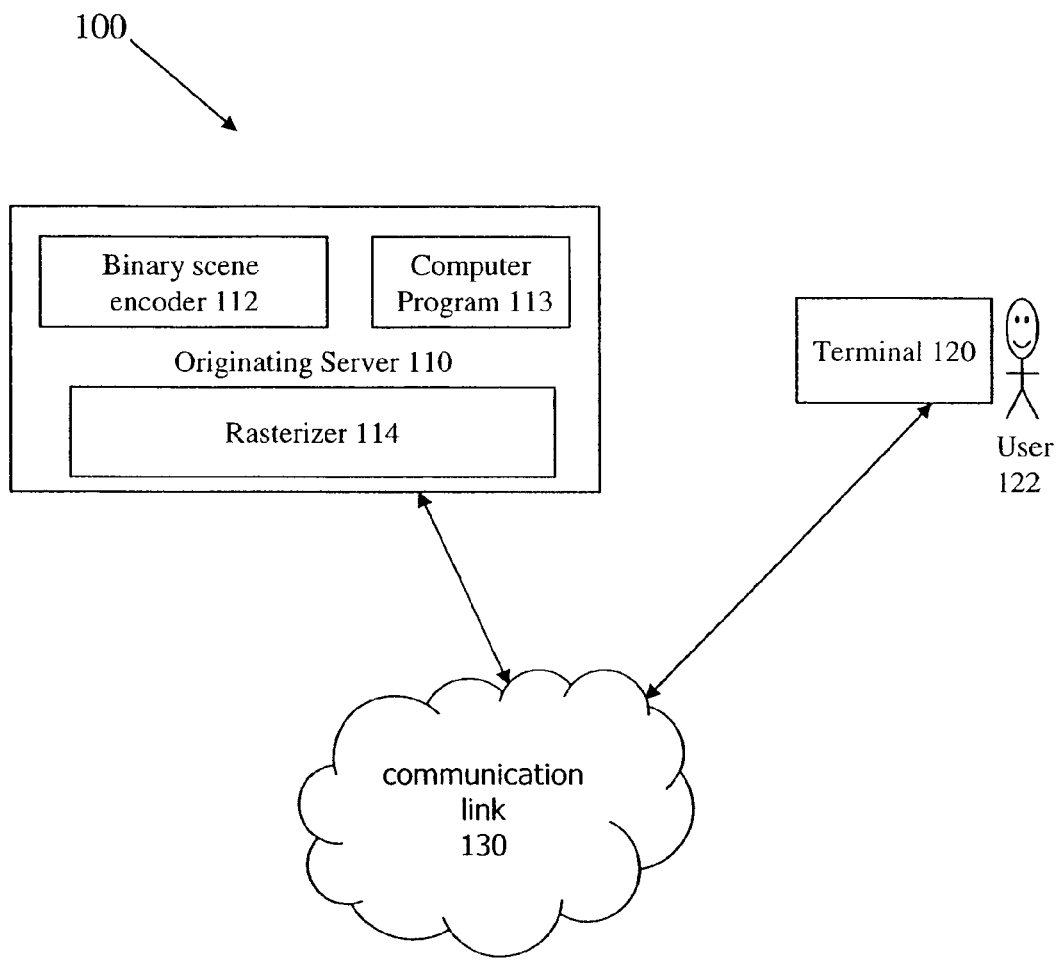
FIG. 1 is a block diagram showing a system for quantization and compression of information in a scene graph.

FIG. 1 is a block diagram showing a system for quantization and compression of information in a scene graph.

A system 100 includes an originating server 110, a terminal 120 and a communication link 130.

The originating server 110 includes a binary scene encoder 112, a rasterizer 114, and a processor, a memory, and sufficient server software to transmit a media stream (such as an MPEG-4 presentation) to a terminal 120.

The binary scene encoder 112 includes a computer program 113 for generating a scene graph, traversing that graph and determining a heuristically optimal placement of quantization parameter nodes. The term "heuristically optimal" means optimal to a degree possible using a particular technique for examining a set of possibilities that cannot be examined exhaustively.

The rasterizer 114 includes a processor and a computer program for generating a bit map and a set of pixels that are responsive to information generated by the computer program 113. In a preferred embodiment, the drawing process implemented by the rasterizer 114 is optimized for rendering MPEG-4 data. Upon generating a set of pixels, the rasterizer 114 sends the set of pixels to the terminal 120.

Although described herein as a single device, the rasterizer 120 and to the binary scene encoder 110 may be incorporated into multiple devices or may be situated at different originating servers 110 that are coupled by a communication link 130.

The terminal 120 is under the control of a user 122. The terminal 120 preferably includes a buffer for storing media and sufficient circuitry or software for presenting the media stream to a user 122. The terminal 120 receives the media stream, buffers and decodes the stream, and presents it to the user 122. In one embodiment, the terminal 120 may receive different media streams from rasterizer 114. The different media streams are integrated at the terminal 120 so as to comprise a single presentation for a viewer 122.

Various embodiments of the terminal 120 include a computer and monitor, or a television and set-top box, among others.

The communication link 130 can include a computer network, such as an Internet, intranet, extranet or a virtual private network. In other embodiments, the communication link 130 can include a direct communication line, a switched network such as a telephone network, a wireless network, a form of packet transmission or some combination thereof. All variations of communication links noted herein are also known in the art of computer communication. In a preferred embodiment, the originating server 110 and the terminal 120 are coupled by the communication link 130.

Figure 2:
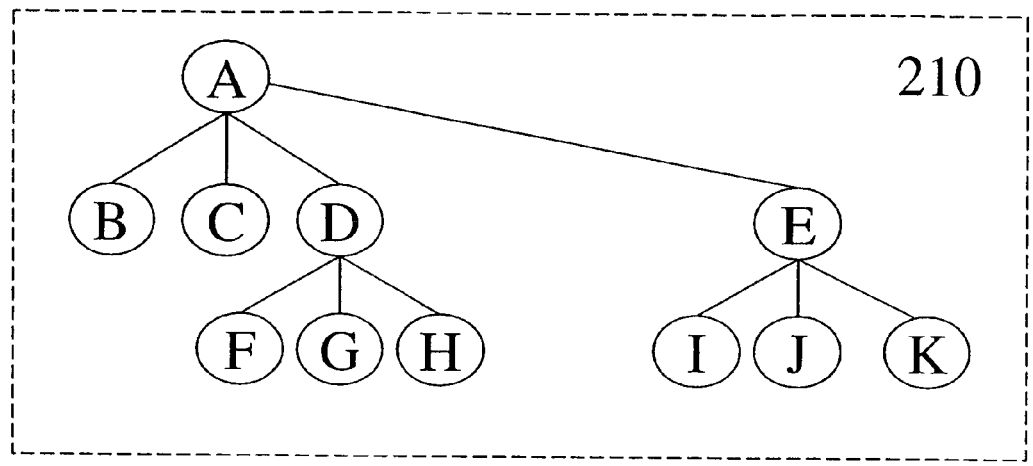
FIG. 2 is a block diagram showing a scene graph and quantization nodes that are selectively placed in optimal positions.
Figure 2:
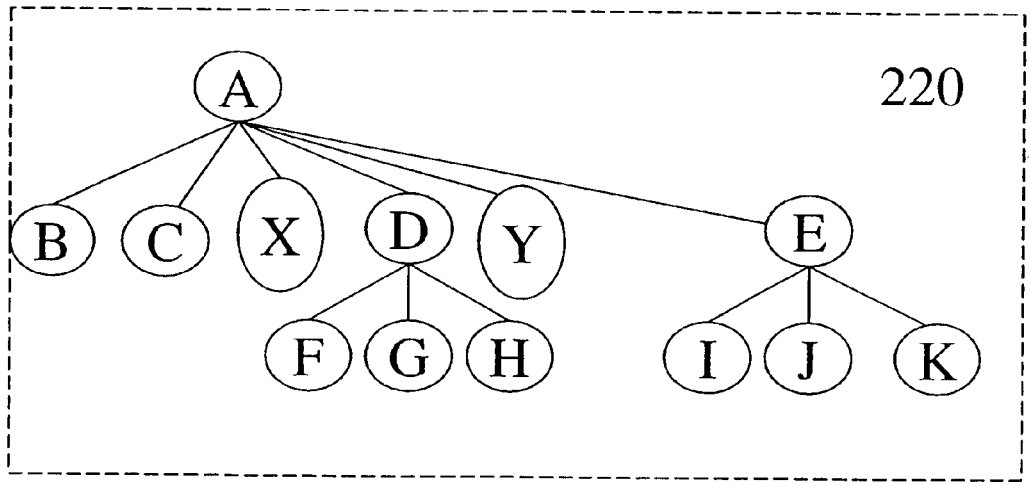

FIG. 2 is a block diagram showing quantization parameter nodes that are selectively placed in optimal positions in a scene graph.

System 200 includes a first scene graph 210 and a second scene graph 220. The first scene graph 210 is converted into the second scene graph 210 using the computer program 113 for determining the optimal placement of quantization parameter nodes.

The first scene graph 210 is responsive to an MPEG-4 scene. It includes a set of nodes, shown here as nodes A-K. The scene graph 210 and set of nodes is exemplary. Other scene graphs may a different number of nodes or a different structure.

A node in a scene graph is a parent node if it has other nodes that descend from it. Thus, the parent nodes in scene graph 210 are nodes A, D, and E.

A node is a child node if it descends from a parent node. Thus, nodes B, C, and D are children of A. Nodes F, G, and H are children of D. Nodes I, J, and K are children of E.

A node may be designated as both a parent and a child if it descends from a node and has nodes that depend from it. Thus, nodes D and E are both parents and children.

Nodes are considered to be siblings if they descend from the same parent. Thus, nodes B, C, D, and E are siblings because they all descend from A. Similarly, nodes F, G, and H are siblings, as are nodes I, J, and K.

Each node in scene graph 210 is associated with a scene construct such as a rectangle. Each node also includes various other parameters such as may relate to color, position and other parameters shown in table 1.

| | |
|---|---|
| None | This parameter is used when there is no quantization. |
| Position3D | This parameter is used for 3D positions of objects. |
| Position 2D | This parameter is used for 2D positions of objects. |
| TextureCoordinate | This parameter is used to show texture coordinates. |
| Angle | This parameter is used for angles. |
| Scale | This parameter is used for scales in transformations. |
| Interpolator Keys | This parameter is used for interpolator keys and MFFloat values. |
| Normals | This parameter is used for normal vectors. |
| Rotations | This parameter is sued to shown rotations of objects. |
| ObjectSize3D | This parameter includes values for 3D object sizes. |
| ObjectSize2D | This parameter includes values for 2D object sizes. |

| | -continued |
|---|---|
| Linear Quantization | This parameter includes values for the maximum, minimum and number of bits. |
| Coord Quantization | This parameter includes lists of coordinates of points, colors and texture. |
| Color | This parameter is used to show color and intensity. |

Table 1 shows the types of values that can be included in the nodes of a scene graph.

Scene graph 220 includes a set of nodes that correspond to the nodes in the first scene graph 210. As with the first scene graph 210, these nodes are designated as nodes A-K. Unlike scene graph 210, scene graph 220 also includes two quantization parameter nodes. These quantization parameter nodes are designated as X and Y.

Similar to the first scene graph 210, the nodes in the second scene graph 220 are associated with a type such as a rectangle. Each node also may include values relating to the parameters included in Table 1.

A quantization parameter node affects the siblings to the right of the quantization node and the children of those siblings. A node may be affected by only one quantization parameter node. Thus, in the second scene graph 220, the quantization parameter node X affects nodes D, F, G, and H. Quantization parameter node Y affects nodes E, I, J, and K.

Computer program 113 transforms scene graph 210 into scene graph 220 by insertion of the quantization parameter nodes. The location for insertion of the quantization parameter nodes is chosen so as to result in the optimal savings of bits that can be achieved with respect to a predetermined maximum error. The predetermined error is chosen so the perceptible degradation in the visible presentation of media is negligible. Using a predetermined error allows an author to specify how much error is tolerable in the presentation. It is important to note that allowing quantization error does not imply that there will be visual degradation since the error may be imperceptible.

In one embodiment, the predetermined error may be derived from the screen resolution of a presentation element used in the presentation of the multi-media presentation. In other embodiments, the predetermined error may be a fixed percentage of the range of values for one or more quantization types, or a percentage of differences of successive related values.

A quantization parameter node includes maximum and minimum values for each quantization type included in the nodes that it affects. For example, if the nodes affected by quantization parameter Y include color, rotation, angle and scale, then the quantization parameter Y will include maximum and minimum values for color, rotations, angle and scale, along with a number of bits that are used to quantize the range of values between the maximum and minimum.

Method of Use

Figure 3:
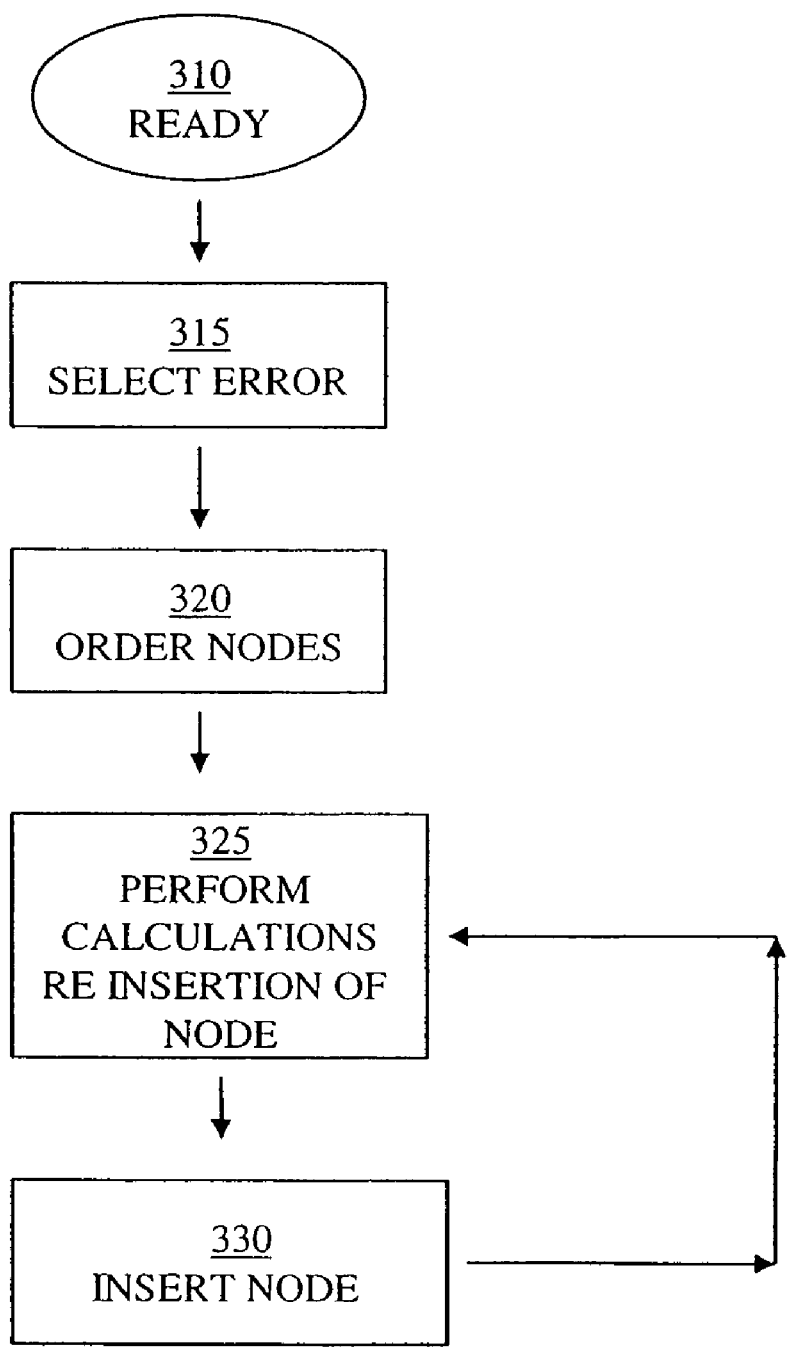
FIG. 3 is a flow diagram showing a method for using a system for quantization and compression of information in a scene graph.

FIG. 3 is a flow diagram showing a method for using a system for quantization and compression of information in a scene graph.

A method 300 includes a set of flow points and a set of steps. In one embodiment, the system 100 performs the method 300, although the method 300 can be performed by other systems. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 310, the system 100 is ready to begin performing a method 300.

At a flow point 315, an error value is selected for each quantization type that is used in the scene graph that is included in Table 1. Error values for quantization types that are not found in the scene graph are not selected.

As noted supra, the error value may be derived from a number of sources, including the screen resolution of a presentation element, a fixed percentage of the range of values for one or more quantization types, a percentage of differences of successive related values or some other standard.

Figure 4:
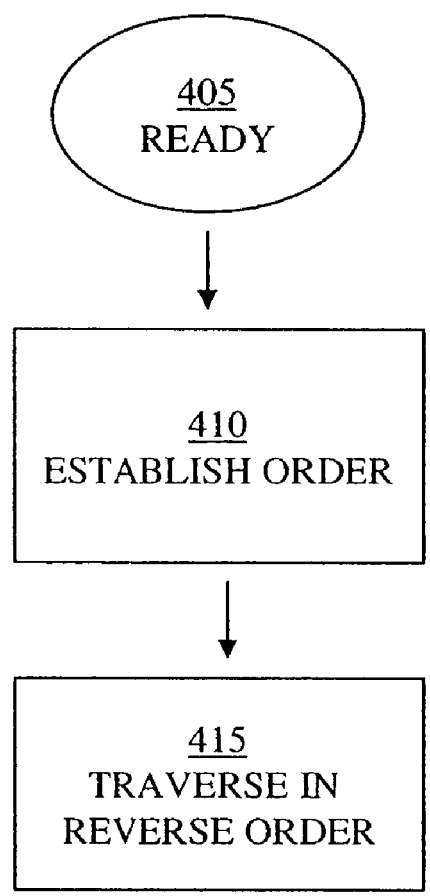
FIG. 4 is a flow diagram of a method for traversing a scene graph used in a system for quantization and compression of information.

At a step 320, the scene graph is traversed depth first to determine an order of the nodes. After determining this order, the scene graph is traversed in the reverse of this order. The following step 325 is performed at each node during this reverse traversal. A detailed example of ordering and reverse traversal is shown in FIG. 4.

At a step 325, a pair of calculations for every pair of successive siblings in the scene graph is made. For these calculations, let C(T,QP) equal the cost of inserting a quantization parameter node QP before node T. Let t1 and t2 represent the first and second siblings, respectively, in a pair of successive siblings. Let QP1 and QP2 be quantization parameters nodes placed before t1 and t2, respectively. Let QP3 be a quantization parameter node that includes the maximum and minimum of values in both t1 and t2. Given the foregoing, the calculations are:

$$A = C(t2, QP3)$$

$$B = C(t1, QP1) + C(t2, QP2)$$

In a step 330, a sub-tree of a scene graph is quantized. The nodes of the sub-tree are examined and the maximum and minimum values for the quantization types are computed over the whole sub-trees. An error bound value for each of the quantization types is used to compute the number of bits of quantization which will result in a quantization error less than the bound.

The quantization process that takes place in this step involves inserting a quantization parameter node to the left of node t1 if the value of A is greater than the value of B as determined in step 325. This quantization node will affect all of the siblings to the right of QP1 and all of the siblings' children. After inserting QP1, the calculations are repeated for the next node in the tree. The order of the nodes for which this calculation is performed is described more fully in FIG. 4.

If the value of A is less than the value of B, then steps 325 and 330 are repeated for the next pair of nodes in the reverse depth-first order. These steps are repeated and the process of comparing the relative cost of inserting quantization parameter nodes and inserting quantization parameter nodes continues until the entire scene graph is traversed.

The steps of the method 300 may be repeated for the remaining scenes in a multi-media presentation until quantization parameter nodes are inserted throughout the presentation where ever it is optimal to insert them.

FIG. 4 is a flow diagram of a method for traversing a scene graph used in a system for quantization and compression of information.

A method 400 includes a set of flow points and a set of steps. In one embodiment, the system 100 performs the method 400, although the method 400 can be performed by other systems. Although the method 400 is described serially, the steps of the method 400 can be performed by separate elements in conjunction or in parallel, whether asynchronously, in a pipelined manner, or otherwise. There is no particular requirement that the method 400 be performed in the same order in which this description lists the steps, except where so indicated.

In a step 405, the system 100 is ready to begin performing a method 400. In one embodiment, the traversal begins with the root node of a scene graph. In other embodiments, the traversal can begin with anywhere in the scene graph.

In a step 410, the scene graph is traversed to establish an order. The ordering begins with the left most node and proceeds through the siblings of that node moving from left to the right. If a sibling has children, the children of the sibling are traversed before moving on to the sibling. This process is continued until the nodes in the tree have been ordered.

Referring back to FIG. 2, the traversal order of the nodes in scene graph 210 would be A, B, C, D, F, G, H, E, I, J, and K.

In a step 415, the scene graph is traversed in the reverse of the order that was determined in the previous step. In this reverse traversal, the last node in the order that was established in step 410 will be first and the first node in that order will be last.

Referring back to FIG. 2, the order of the reversal traversal of scene graph 210 would be K, J, I, E, H, G, F, D, C, B, A.

During this reversal traversal, a determination is made whether to insert a quantization parameter node to the left of the node being traversed. This determination is made for every node except for the right most node in a group of siblings.

The reversal traversal is continued until the scene graph is completely traversed. The process begins again at step 410, when a new scene graph in the multi-media presentation is traversed to establish an order.

Figure 5:
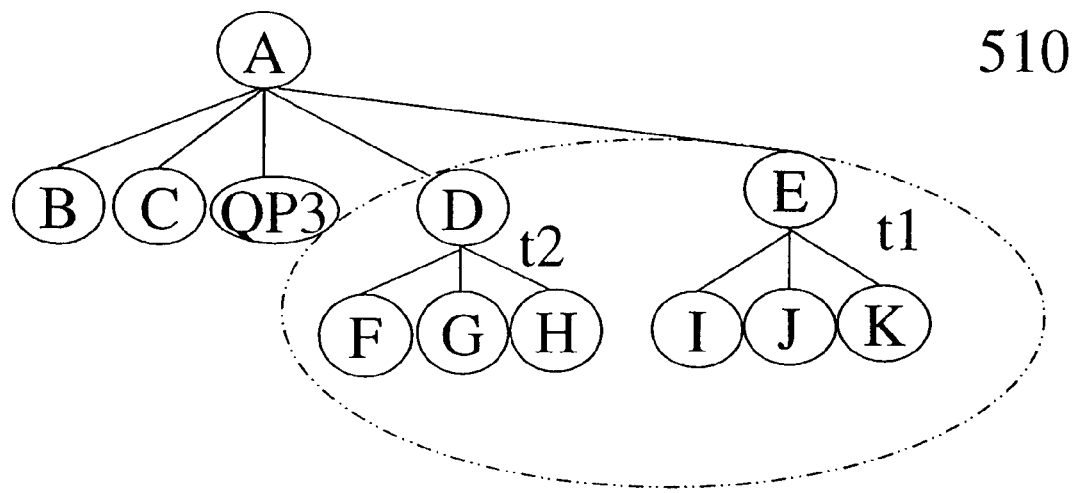
FIG. 5 is a block diagram showing an exemplary scene graph with two subtrees and potential quantization parameter nodes.
Figure 5:
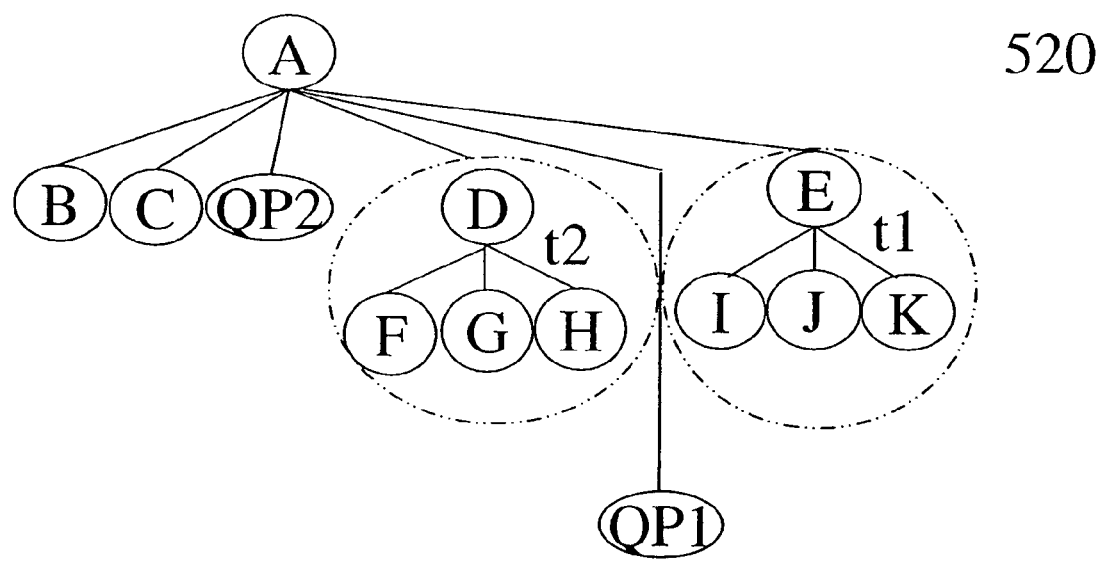

FIG. 5 is a block diagram showing an exemplary scene graph with two subtrees and potential quantization parameter nodes.

A system 500 shows a first scene graph 510 and a second scene graph 520. These two scene graphs are exemplary scene graphs for the purpose of illustrating method 300 and method 400.

Similar to the scene graph in FIG. 2, scene graph 510 and scene graph 520 are responsive to an MPEG 4 scene. As described in FIG. 2, they include parent nodes, child nodes, sibling nodes and quantization parameter nodes. Subtrees are designated t1 and t2.

The first scene graph 510 includes a quantization parameter node designated as QP3. QP3 affects all the nodes in t1 and t2. The second scene graph 520 includes two quantization parameter nodes, designated as QP1 and QP2. QP1 affects all of the nodes in t1. QP2 affects all of the nodes in t2. QP1, QP2 and QP3 show the potential location of quantization parameter nodes.

During the performance of methods 300 and method 400, the cost of scene graph 510 is compared to the cost of scene graph 520. As noted in step 335 of method 300, the following calculations are made:

$A = C(t2, QP3)$ $B = C(t1, QP1) + C(t2, QP2)$

If A>B, QP1 is inserted at the tree at t1. If A<B, then the traversal continues as shown in FIG. 4 and the process is continued. This pair of calculations is made for every pair of successive siblings in a scene graph (using the ordering described in FIG. 4) so as to determine a heuristically optimal placement of quantization parameter nodes based upon the relative cost of inserting a node at a particular location.

ALTERNATIVE EMBODIMENTS

Although preferred embodiments are disclosed herein, many variations are possible which remain within the concept, scope and spirit of the invention; these variations would be clear to those skilled in the art after perusal of this application.

The invention claimed is:

1. A method for compressing a scene graph in a multi-media presentation, the method comprising:
   ordering a plurality of graph nodes in the screen graph in a first direction;
   traversing said ordered graph nodes in a second direction, the second direction being a reverse of said first direction, wherein the step of traversing comprises determining, for each traversed ordered graph node that has a successive sibling node lying in the second direction, whether to insert a quantization parameter node immediately following said each traversed ordered node, each quantization parameter node being capable of affecting compression of ordered nodes lying in the first direction from said each quantization parameter node; and
   inserting the quantization node between said each traversed ordered graph node and the successive sibling node lying in the second direction in response to the step of determining.

2. The method of compressing according to claim 1, wherein the step of determining comprises costs of inserting a single quantization parameter node controlling compression of the successive sibling node and of said each traversed ordered graph node to the cost of inserting separate quantization parameter nodes to control compression of the successive sibling node and of said each traversed ordered graph node.

3. The method of compressing according to claim 2, wherein the step of comparing comprises:
   calculating a first cost of inserting a first quantization parameter node between said each traversed ordered graph node and the successive sibling node lying in the second direction, the first quantization parameter node controlling compression of said each traversed ordered graph node;
   calculating a second cost of inserting a second quantization parameter node lying immediately adjacent to the successive sibling node in the second direction, the second quantization parameter node controlling compression of the successive sibling node while the first quantization parameter node controls compression of said each traversed ordered graph node; and
   calculating a third cost of inserting a third quantization parameter node lying immediately adjacent to the successive sibling node in the second direction, the third quantization parameter node controlling compression of the successive sibling node and of said each traversed ordered graph node.

4. The method of compressing according to claim 3, wherein the step of comparing further comprises:
   summing the first cost and the second cost to obtain a combined cost; and deciding whether the third cost is greater than the combined cost.

5. A system for compressing a scene graph in a multimedia presentation, the system comprising a memory storing computer instructions and a processor coupled to the memory, the processor being capable of executing the instructions, wherein the instructions, when executed by the processor, cause the processor to perform the following steps:

ordering graph nodes of a plurality of nodes in the scene graph in a first direction to obtain ordered graph nodes;

selecting one or more ranges of quantization values for one or more quantization types of the ordered graph nodes;

traversing the ordered graph nodes in a second direction, the second direction being a reverse of the first direction, wherein the step of traversing comprises determining, for each traversed ordered graph node that has a successive sibling node lying in the second direction, whether to insert a quantization parameter node immediately following said each traversed ordered node, each quantization parameter node being capable of affecting compression of ordered nodes lying in the first direction from said each quantization parameter node; and inserting the quantization node between said each traversed ordered graph node and the successive sibling node lying in the second direction in response to the step of determining.

6. The system according to claim 5, wherein the instructions, when executed by the processor, cause the processor, in the course of performing the step of determining, to compare costs of inserting a single quantization parameter node controlling compression of the successive sibling node and of said each traversed ordered graph node to the cost of inserting separate quantization parameter nodes to control compression of the successive sibling node and of said each traversed ordered graph node.

7. The system according to claim 6, wherein the instructions, when executed by the processor, cause the processor, in the course of performing the step of comparing, to:

calculate a first cost of inserting a first quantization parameter node between said each traversed ordered graph node and the successive sibling node lying in the second direction, the first quantization parameter node controlling compression of said each traversed ordered graph node;

calculate a second cost of inserting a second quantization parameter node lying immediately adjacent to the successive sibling node in the second direction, the second quantization parameter node controlling compression of the successive sibling node while the first quantization parameter node controls compression of said each traversed ordered graph node; and calculate a third cost of inserting a third quantization node lying immediately adjacent to the successive sibling node in the second direction, the third quantization parameter node controlling compression of the successive sibling node and of each traversed ordered graph node.

8. The system according to claim 7, wherein the instructions, when executed by the processor, cause the processor, in the course of performing the step of comparing, to:

sum the first and the second cost to obtain a combined cost; and decide whether the third cost is greater than the combined cost.

9. The system according to claim 8, wherein the instructions, when executed by the processor, cause the processor to insert the quantization node between said each traversed ordered graph node and the successive sibling node lying in the second direction when the third cost is greater than the combined cost.

10. The system according to claim 9, wherein the instructions, when executed by the processor, cause the processor, in the course of performing the step of selecting, to select the one or more ranges of quantization values for a quantization type affecting object position.

11. The system according to claim 9, wherein the instructions, when executed by the processor, cause the processor, in the course of performing the step of selecting, to select the one or more ranges of quantization values for a quantization type affecting object size.

12. The system of claim 9, wherein the instructions, when executed by the processor, cause the processor, in the course of performing the step of selecting, to select the one or more ranges of quantization values for a quantization type affecting color and intensity.

13. The system according to claim 9, wherein the instructions, when executed by the processor, cause the processor, in the course of performing the step of selecting, to select the one or more ranges of quantization values for a quantization type affecting scale in transformation.

14. The system according to claim 9, wherein the instructions, when executed by the processor, cause the processor, in the course of performing the step of selecting, to select the one or more ranges of quantization values for a quantization type affecting angles.

* * * * *